US010040901B2

(12) United States Patent
Hofmann et al.

(10) Patent No.: US 10,040,901 B2
(45) Date of Patent: Aug. 7, 2018

(54) METHOD FOR PRODUCING POLYETHER CARBONATE POLYOLS

(71) Applicant: Covestro Deutschland AG, Leverkusen (DE)

(72) Inventors: Jörg Hofmann, Krefeld (DE); Stefanie Braun, Köln (DE); Kai Laemmerhold, Aachen (DE); Aurel Wolf, Wülfrath (DE); Michael Traving, Burscheid (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 51 days.

(21) Appl. No.: 15/323,362

(22) PCT Filed: Jun. 30, 2015

(86) PCT No.: PCT/EP2015/064808
§ 371 (c)(1),
(2) Date: Dec. 30, 2016

(87) PCT Pub. No.: WO2016/001206
PCT Pub. Date: Jan. 7, 2016

(65) Prior Publication Data
US 2017/0137569 A1 May 18, 2017

(30) Foreign Application Priority Data
Jul. 3, 2014 (EP) .................................. 14175607

(51) Int. Cl.
*C08G 64/34* (2006.01)
*C08G 65/26* (2006.01)

(52) U.S. Cl.
CPC ......... *C08G 64/34* (2013.01); *C08G 65/2603* (2013.01); *C08G 65/2663* (2013.01)

(58) Field of Classification Search
CPC ..................................................... C08G 64/34
See application file for complete search history.

(56) References Cited

U.S. PATENT DOCUMENTS

| | | | | |
|---|---|---|---|---|
| 8,324,419 B2 * | 12/2012 | Mijolovic | .......... | C08G 64/0208 558/276 |
| 9,045,592 B2 * | 6/2015 | Gurtler | ................ | C08G 64/183 |
| 9,249,259 B2 * | 2/2016 | Muller | ................... | C08G 64/34 |
| 9,273,183 B2 * | 3/2016 | Muller | ................... | C08G 64/34 |
| 9,315,622 B2 * | 4/2016 | Hofmann | ............... | C08G 65/34 |
| 9,676,905 B2 * | 6/2017 | Muller | ................... | C08G 64/34 |
| 2010/0048935 A1 | 2/2010 | Mijolovic et al. | | |
| 2015/0259475 A1 | 9/2015 | Müller et al. | | |

FOREIGN PATENT DOCUMENTS

| | | |
|---|---|---|
| EP | 1942126 A1 | 7/2008 |
| EP | 2703426 A1 | 3/2014 |
| WO | WO 2008/092767 A1 | 8/2008 |

OTHER PUBLICATIONS

International Search Report and Written Opinion for International Application No. PCT/EP2015/064808, European Patent Office, dated Sep. 14, 2015.

* cited by examiner

*Primary Examiner* — Golam M Shameem
(74) *Attorney, Agent, or Firm* — K&L Gates LLP

(57) ABSTRACT

The invention relates to a method for producing polyether carbonate polyols by binding alkylene oxides and carbon dioxide to one or more H-functional starter substance/s in the presence of a double metal cyanide (DMC) catalyst, characterized in that (y) one or more H-functional starter substance/s and DMC catalyst are continuously metered into the reactor during the binding process, and the free alkylene oxide concentration in the reaction mixture amounts to 1.5 to 5.0 wt %, and the obtained reaction mixture is continuously discharged from the reactor.

18 Claims, No Drawings

METHOD FOR PRODUCING POLYETHER CARBONATE POLYOLS

CROSS-REFERENCE TO RELATED APPLICATIONS

This application is a U.S. national stage application, filed under 35 U.S.C. § 371, of PCT/EP2015/064808, which was filed on Jun. 30, 2015, and which claims priority to European Patent Application No. EP 14175607.2, filed Jul. 3, 2014, the contents of which are incorporated by reference into this specification.

FIELD

The present invention relates to a process for preparing polyether carbonate polyols by catalytic copolymerization of carbon dioxide ($CO_2$) with alkylene oxides in the presence of one or more H-functional starter substances.

BACKGROUND

The preparation of polyether carbonate polyols by catalytic reaction of alkylene oxides (epoxides) and carbon dioxide in the presence of H-functional starter substances ("starters") has been the subject of intensive study for more than 40 years (e.g. Inoue et al., Copolymerization of Carbon Dioxide and Epoxide with Organometallic Compounds; Die Makromolekulare Chemie 130, 210-220, 1969). This reaction is shown in schematic form in scheme (I), where R is an organic radical such as alkyl, alkylaryl or aryl, each of which may also contain heteroatoms, for example O, S, Si etc., and where e, f and g are integers, and where the product shown here in scheme (I) for the polyether carbonate polyol should merely be understood such that blocks having the structure shown may in principle be present in the polyether carbonate polyol obtained, but the sequence, number and length of the blocks and OH functionality of the starter can vary, and is not limited to the polyether carbonate polyol shown in scheme (I). This reaction (see scheme (I)) is environmentally very advantageous since this reaction constitutes the conversion of a greenhouse gas such as $CO_2$ to a polymer. A further product, actually a by-product, formed is the cyclic carbonate shown in scheme (I) (for example, when $R=CH_3$, propylene carbonate).

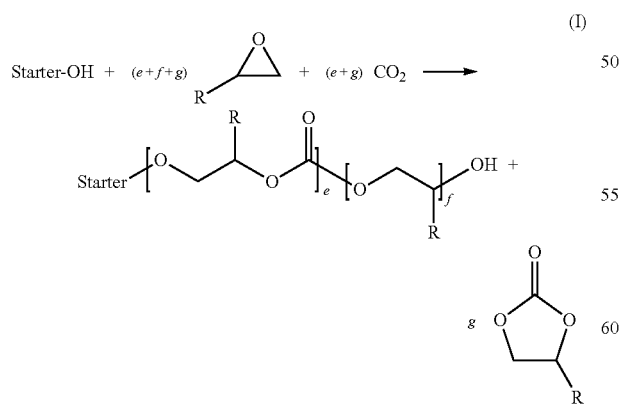

EP-A 0 222 453 discloses a process for preparing polycarbonates from alkylene oxides and carbon dioxide using a catalyst system composed of DMC catalyst and a cocatalyst such as zinc sulfate. The polymerization is initiated here by once contacting a portion of the alkylene oxide with the catalyst system. Only thereafter are the remaining amount of alkylene oxide and the carbon dioxide metered in simultaneously. The amount of 60% by weight of alkylene oxide compound relative to the H-functional starter compound, as specified in EP-A 0 222 453 for the activation step in examples 1 to 7, is high and has the disadvantage that this constitutes a certain safety risk for industrial scale applications because of the high exothermicity of the homopolymerization of alkylene oxide compounds.

WO-A 2008/092767 discloses a process for preparing polyether carbonate polyols, characterized in that one or more H-functional starter substances are initially charged in the reactor and that one or more H-functional starter substances are metered continuously into the reactor during the reaction. In the examples, WO-A 2008/092767 discloses a process (in the context of the present invention a CAOS semi-batchwise process) in which H-functional starter substance and DMC catalyst are initially charged and, under a $CO_2$ atmosphere, propylene oxide and H-functional starter substance are metered in intermittently, wherein the addition of propylene oxide and H-functional starter substance is started at a free propylene oxide content of less than 3% by weight, and wherein the addition of these substances is stopped at a free propylene oxide content of 8% by weight.

SUMMARY

It was therefore an object of the present invention to provide a process for preparing polyether carbonate polyols, wherein high incorporation of $CO_2$ into the polyether carbonate polyol and a favorable selectivity (i.e. low ratio of cyclic carbonate to linear polymer-bound carbonate) are attained and a stable process regime in the copolymerization is enabled (i.e. no significant variations in pressure and/or temperature in the reaction mixture of the copolymerization).

It has been found that, surprisingly, the object of the invention is achieved by a process for preparing polyether carbonate polyols by adding alkylene oxides and carbon dioxide onto one or more H-functional starter substances in the presence of a double metal cyanide (DMC) catalyst, characterized in that (α) optionally, a portion of the H-functional starter substances and/or a suspension medium containing no H-functional groups is initially charged in a reactor, in each case optionally together with DMC catalyst, (β) optionally, a portion of alkylene oxide is added to the mixture from step (α) at temperatures of 90 to 150° C., in which case the addition of the alkylene oxide compound is interrupted, and (γ) one or more H-functional starter substances and DMC catalyst are metered continuously into the reactor during the addition, and the free alkylene oxide concentration during the addition is from 1.5% to 5.0% by weight, preferably from 1.5% to 4.5% by weight, more preferably from 2.0% to 4.0% by weight (copolymerization), and the resulting reaction mixture is removed continuously from the reactor.

DETAILED DESCRIPTION

Step (α):

In the process of the invention, it is possible first to initially charge the reactor with a portion of the H-functional starter substances and/or a suspension medium containing no H-functional groups. Subsequently, the amount of DMC catalyst required for the polyaddition, preferably in unactivated form, is added to the reactor. The sequence of addition is not crucial. It is also possible to charge the reactor first with the DMC catalyst and then with the suspension medium. Alternatively, it is also possible first to suspend the DMC catalyst in the inert suspension medium and then to charge the reactor with the suspension. The suspension medium provides an adequate heat exchange area with the reactor wall or cooling elements installed in the reactor, such that the heat of reaction released can be removed very efficiently. Moreover, the suspension medium, in the event of a cooling failure, provides heat capacity, such that the temperature in this case can be kept below the breakdown temperature of the reaction mixture.

Any amount of the H-functional starter substance(s) used in step ($\alpha$) may contain component K, for example in an amount of at least 100 ppm, preferably of 100 to 10 000 ppm.

The suspension media used in accordance with the invention do not contain any H-functional groups. Suitable suspension media are all polar aprotic, weakly polar aprotic and nonpolar aprotic solvents, none of which contain any H-functional groups. The suspension medium used may also be a mixture of two or more of these suspension media. Mention is made by way of example at this point of the following polar aprotic solvents: 4-methyl-2-oxo-1,3-dioxolane (also referred to hereinafter as cyclic propylene carbonate or cPC), 1,3-dioxolan-2-one (also referred to hereinafter as cyclic ethylene carbonate or cEC), acetone, methyl ethyl ketone, acetonitrile, nitromethane, dimethyl sulfoxide, sulfolane, dimethylformamide, dimethylacetamide and N-methylpyrrolidone. The group of the nonpolar and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media used are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

Likewise suitable as suspension media used in accordance with the invention are aliphatic lactones, aromatic lactones, lactides, cyclic carbonates having at least three optionally substituted methylene groups between the oxygen atoms of the carbonate group, aliphatic cyclic anhydrides and aromatic cyclic anhydrides.

Aliphatic or aromatic lactones in the context of the invention are cyclic compounds containing an ester bond in the ring, preferably 4-membered lactone rings such as β-propiolactone, β-butyrolactone, β-isovalerolactone, β-caprolactone, β-isocaprolactone, β-methyl-β-valerolactone, 5-membered lactone rings such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered lactone rings such as δ-valerolactone, 1,4-dioxan-2-one, dihydrocoumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H, 3H-benzoidelisochromen-1-one, 6,7-dimethoxy-1,4-dihydro-3H-isochromen-3-one and 3-phenyl-3,4-dihydro-1H-isochromen-1-one, 7-membered lactone rings such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, higher lactone rings such as (7E)-oxacycloheptadec-7-en-2-one.

Particular preference is given to ε-caprolactone and dihydrocoumarin.

Lactides in the context of the invention are cyclic compounds containing two or more ester bonds in the ring, preferably glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-dione, 3,6-di(but-3-en-1-yl)-1,4-dioxane-2,5-dione (in each case including optically active forms). Particular preference is given to L-lactide.

Cyclic carbonates having at least three optionally substituted methylene groups between the oxygen atoms of the carbonate group are preferably trimethylene carbonate, neopentyl glycol carbonate (5,5-dimethyl-1,3-dioxan-2-one), 2,2,4-trimethylpentane-1,3-diol carbonate, 2,2-dimethylbutane-1,3-diol carbonate, butane-1,3-diol carbonate, 2-methylpropane-1,3-diol carbonate, pentane-2,4-diol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Cyclic anhydrides are preferably succinic anhydride, maleic anhydride, phthalic anhydride, cyclohexane-1,2-dicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6(3H)-dione, 1,4-dioxane-2,6-dione, 2H-pyran-2,4,6(3H,5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

The suspension medium used may also be a mixture of two or more of the suspension media mentioned. Most preferably, the suspension medium used in step ($\alpha$) is at least one compound selected from the group consisting of 4-methyl-2-oxo-1,3-dioxolane, 1,3-dioxolan-2-one, acetone, methyl ethyl ketone, acetonitrile, nitromethane, dimethyl sulfoxide, sulfolane, dimethylformamide, dimethylacetamide, N-methylpyrrolidone, dioxane, diethyl ether, methyl tert-butyl ether, tetrahydrofuran, ethyl acetate, butyl acetate, pentane, n-hexane, benzene, toluene, xylene, ethylbenzene, chloroform, chlorobenzene, dichlorobenzene, carbon tetrachloride, ε-caprolactone, dihydrocoumarin, trimethylene carbonate, neopentyl glycol carbonate, 3,6-dimethyl-1,4-dioxane-2,5-dione, succinic anhydride, maleic anhydride and phthalic anhydride.

In one embodiment of the invention, in step (α), a suspension medium containing no H-functional groups is initially charged in the reactor, optionally together with DMC catalyst, without initially charging any H-functional starter substance in the reactor. Alternatively, it is also possible in step (α) to initially charge the reactor with a suspension medium containing no H-functional groups, and additionally a portion of the H-functional starter substances and optionally DMC catalyst.

The DMC catalyst is preferably used in an amount such that the content of DMC catalyst in the resulting reaction product is 10 to 10 000 ppm, more preferably 20 to 5000 ppm, and most preferably 50 to 500 ppm.

In a preferred embodiment, inert gas (for example argon or nitrogen), an inert gas/carbon dioxide mixture or carbon dioxide is introduced into the resulting mixture of (i) a portion of the H-functional starter substances and/or of suspension medium and (ii) DMC catalyst at a temperature of 90° C. to 150° C., more preferably of 100° C. to 140° C., and at the same time a reduced pressure (absolute) of 10 mbar to 800 mbar, more preferably of 50 mbar to 200 mbar, is applied.

In an alternative preferred embodiment, the resulting mixture of (i) a portion of the H-functional starter substances and/or suspension medium and (ii) DMC catalyst is contacted at least once, preferably three times, at a temperature of 90° C. to 150° C., more preferably of 100° C. to 140° C., with 1.5 bar to 10 bar (absolute), more preferably 3 bar to 6 bar (absolute), of an inert gas (for example argon or nitrogen), an inert gas/carbon dioxide mixture or carbon dioxide and then the gauge pressure is reduced in each case to about 1 bar (absolute).

The DMC catalyst can be added in solid form or as a suspension in a suspension medium or in a mixture of at least two suspension media.

In a further preferred embodiment, in step (α), (α-I) a portion of the H-functional starter substances and/or suspension medium is initially charged and (α-II) the temperature of the portion of the H-functional starter substances and/or the suspension medium is brought to 50 to 200° C., preferably 80 to 160° C., more preferably 100 to 140° C., and/or the pressure in the reactor is lowered to less than 500 mbar, preferably 5 mbar to 100 mbar, in the course of which an inert gas stream (for example of argon or nitrogen), an inert gas/carbon dioxide stream or a carbon dioxide stream is optionally passed through the reactor, wherein the double metal cyanide catalyst is added to the portion of the H-functional starter substances and/or suspension medium in step (α-I) or immediately thereafter in step (α-II), and wherein the suspension medium does not contain any H-functional groups.

Step (β):

Step (β) serves for activation of the DMC catalyst. This step can optionally be conducted under inert gas atmosphere, under an atmosphere composed of an inert gas/carbon dioxide mixture or under a carbon dioxide atmosphere. Activation in the context of this invention refers to a step in which a portion of alkylene oxide is added to the DMC catalyst suspension at temperatures of 90° C. to 150° C. and then the addition of the alkylene oxide is stopped, with observation of evolution of heat caused by a subsequent exothermic chemical reaction, which can lead to a temperature spike ("hotspot"), and of a pressure drop in the reactor caused by the conversion of alkylene oxide and possibly $CO_2$. The process step of activation is the period of time from the addition of the portion of alkylene oxide, optionally in the presence of $CO_2$, to the DMC catalyst until the occurrence of the evolution of heat. Optionally, the portion of the alkylene oxide can be added to the DMC catalyst in a plurality of individual steps, optionally in the presence of $CO_2$, and then the addition of the alkylene oxide can be stopped in each case. In this case, the process step of activation comprises the period from the addition of the first portion of alkylene oxide, optionally in the presence of $CO_2$, to the DMC catalyst until the occurrence of the evolution of heat after addition of the last portion of alkylene oxide. In general, the activation step may be preceded by a step for drying the DMC catalyst and optionally the H-functional starter compound at elevated temperature and/or reduced pressure, optionally while passing an inert gas through the reaction mixture.

The metered addition of one or more alkylene oxides (and optionally of the carbon dioxide) can in principle be effected in different ways. The metered addition can be started from the reduced pressure or at a preselected supply pressure. The supply pressure is preferably established by introducing an inert gas (for example nitrogen or argon) or carbon dioxide, the (absolute) pressure being 5 mbar to 100 bar, preferably 10 mbar to 50 bar and more preferably 20 mbar to 50 bar.

In a preferred embodiment, the amount of one or more alkylene oxides used in the activation in step (β) is 0.1% to 25.0% by weight, preferably 1.0% to 20.0% by weight, more preferably 2.0% to 16.0% by weight (based on the amount of suspension medium used in step (α)). The alkylene oxide can be added in one step or in two or more portions. Preferably, addition of a portion of the alkylene oxide is followed by interruption of the addition of the alkylene oxide until the occurrence of evolution of heat, and only then is the next portion of alkylene oxide added. Preference is also given to a two-stage activation (step β), wherein (β1) in a first activation stage a first portion of alkylene oxide is added under inert gas atmosphere and (β2) in a second activation stage a second portion of alkylene oxide is added under carbon dioxide atmosphere.

Step (γ):

According to the invention, the metered addition of one or more H-functional starter substances, one or more alkylene oxides and optionally also the carbon dioxide into the reactor is continuous. The term "continuous" as used here can be defined as a mode of addition of a reactant such that a concentration of the reactant effective for the copolymerization is maintained, meaning that, for example, the metered addition can be effected with a constant metering rate, with a varying metering rate or in portions. Optionally, the H-functional starter substances used in step (γ) contain at least 1000 ppm of component K.

It is possible, during the addition of the alkylene oxide and/or the H-functional starter substances, to increase or lower the $CO_2$ pressure gradually or stepwise or to leave it constant. Preferably, the total pressure is kept constant during the reaction by replenishment of carbon dioxide. The metered addition of one or more alkylene oxides and/or the one or more H-functional starter substances is simultaneous or sequential with respect to the metered addition of carbon dioxide. It is possible to meter in the alkylene oxide with a constant metering rate or to increase or lower the metering rate gradually or stepwise or to add the alkylene oxide in portions. Preferably, the alkylene oxide is added to the reaction mixture at a constant metering rate. If two or more alkylene oxides are used for synthesis of the polyether carbonate polyols, the alkylene oxides can be metered in individually or as a mixture. The metered addition of the alkylene oxides or the H-functional starter substances can be effected simultaneously or sequentially via separate feeds (additions) in each case or via one or more feeds, in which case the alkylene oxides or the H-functional starter substances can be metered in individually or as a mixture.

Preference is given to using an excess of carbon dioxide based on the calculated amount of carbon dioxide incorporated in the polyether carbonate polyol, since an excess of carbon dioxide is advantageous because of the inertness of carbon dioxide. The amount of carbon dioxide can be fixed via the total pressure under the particular reaction conditions. An advantageous total (absolute) pressure for the copolymerization for preparation of the polyether carbonate polyols has been found to be the range from 0.01 to 120 bar, preferably 0.1 to 110 bar, more preferably from 1 to 100 bar. It is possible to feed in the carbon dioxide continuously or in portions. The amount of the carbon dioxide (reported as pressure) may vary in the course of addition of the alkylene oxides. $CO_2$ can also be added to the reactor in solid form and then be converted to the gaseous, dissolved, liquid and/or supercritical state under the chosen reaction conditions.

One feature of a preferred embodiment of the process of the invention is that, in step ($\gamma$), the total amount of the one or more H-functional starter substances is added. This addition can be effected at a constant metering rate, with a varying metering rate, or in portions.

For the process of the invention, it has additionally been found that the copolymerization (step ($\gamma$)) for preparation of the polyether carbonate polyols is conducted advantageously at 50° C. to 150° C., preferably at 60° C. to 145° C., more preferably at 70° C. to 140° C. and most preferably at 90° C. to 130° C. If temperatures below 50° C. are set, the reaction generally becomes very slow. At temperatures above 150° C., the amount of unwanted by-products rises significantly.

The metered addition of the alkylene oxide, the H-functional starter compound and the DMC catalyst can be effected via separate or combined metering points. In a preferred embodiment, the alkylene oxide and the H-functional starter compound are fed continuously to the reaction mixture via separate metering points. This addition of the one or more H-functional starter substances can be effected in the form of a continuous metered addition to the reactor or in portions.

Steps ($\alpha$), ($\beta$) and ($\gamma$) can be conducted in the same reactor or each separately in different reactors. Particularly preferred reactor types are: tubular reactors, stirred tanks and loop reactors.

Polyether carbonate polyols can be prepared in a stirred tank, in which case the stirred tank, according to the embodiment and mode of operation, is cooled via the reactor jacket, internal cooling surfaces and/or cooling surfaces within a pumped circulation system. In the continuous reaction regime of the invention, in which the resulting reaction mixture is withdrawn continuously from the reactor, particular attention should be paid to the rate of metered addition of the alkylene oxide. It should be adjusted such that, in spite of the inhibiting effect of the carbon dioxide, the alkylene oxides are depleted sufficiently rapidly.

The concentration of free alkylene oxides in the reaction mixture during the activation step (step $\beta$) is preferably >0% to 100% by weight, more preferably >0% to 50% by weight, most preferably >0% to 20% by weight (based in each case on the weight of the reaction mixture).

The free alkylene oxide concentration in the reaction mixture during the addition (step $\gamma$), according to the invention, is from 1.5% to 5.0% by weight, preferably 1.5% to 4.5% by weight, more preferably 2.0% to 4.0% by weight (based in each case on the weight of the reaction mixture). It has been found that, surprisingly, within the inventive range for the free alkylene oxide concentration in the copolymerization, high incorporation of $CO_2$ into the polyether carbonate polyol and a favorable selectivity (i.e. low ratio of cyclic carbonate to linear polymer-bound carbonate) are attained, combined with a simultaneously stable process regime in the copolymerization (i.e. no significant variations in pressure and/or temperature in the reaction mixture of the copolymerization). If, by contrast, the copolymerization is effected below the inventive range for the free alkylene oxide concentration, a less favorable selectivity (i.e. higher ratio of cyclic carbonate to linear polymer-bound carbonate) is found. On the other hand, the process regime in the copolymerization becomes unstable because of greater pressure and/or temperature variations in the copolymerization reaction mixture when the free alkylene oxide concentration in the copolymerization is above the inventive range.

According to the invention, the polyether carbonate polyols are prepared in a continuous process which comprises both a continuous copolymerization and a continuous addition of the one or more H-functional starter substances.

The invention preferably also provides a process wherein, in step ($\gamma$), one or more H-functional starter substances containing at least 1000 ppm of component K, one or more alkylene oxides and DMC catalyst are metered continuously into the reactor in the presence of carbon dioxide ("copolymerization"), and wherein the resulting reaction mixture (comprising the reaction product) is removed continuously from the reactor. Preferably, in step ($\gamma$), the DMC catalyst is added continuously in suspension in H-functional starter compound.

For example, for the continuous process for preparing the polyether carbonate polyols in steps ($\alpha$) and ($\beta$), a mixture containing activated DMC catalyst is prepared, then, in step ($\gamma$), ($\gamma$1) a portion each of one or more H-functional starter substances, one or more alkylene oxides and carbon dioxide are metered in to initiate the copolymerization, and ($\gamma$2) during the progress of the copolymerization, the remaining amount of each of DMC catalyst, one or more starter substances and alkylene oxides is metered in continuously in the presence of carbon dioxide, with simultaneous continuous removal of resulting reaction mixture from the reactor.

In step ($\gamma$), the DMC catalyst is preferably added in a suspension in the H-functional starter compound, the amount preferably being chosen such that the content of DMC catalyst in the resulting reaction product is 10 to 10 000 ppm, more preferably 20 to 5000 ppm and most preferably 50 to 500 ppm.

Preferably, steps ($\alpha$) and ($\beta$) are conducted in a first reactor, and the resulting reaction mixture is then transferred into a second reactor for the copolymerization in step (γ). It is also possible to conduct steps (α), (β) and (γ) in one reactor.

It has also been found that the process of the present invention can be used for preparation of large amounts of the polyether carbonate polyol product, in which case a DMC catalyst activated according to steps (α) and (β) in a portion of the H-functional starter substances and/or in suspension medium is initially used, and the DMC catalyst is added without prior activation during the copolymerization (γ).

A particularly advantageous feature of the preferred embodiment of the present invention is thus the ability to use "fresh" DMC catalysts without activation for the portion of DMC catalyst which is added continuously in step (γ). An activation of DMC catalysts to be conducted analogously to step (β) encompasses not just additional attention from the operator, which results in an increase in manufacturing costs, but also requires a pressure reaction vessel, which also results in an increase in the capital costs in the construction of a corresponding production plant. Here, "fresh" catalyst is defined as unactivated DMC catalyst in solid form or in the form of a slurry in a starter substance or suspension medium. The ability of the present process to use fresh unactivated DMC catalyst in step (γ) enables significant savings in the commercial preparation of polyether carbonate polyols and is a preferred embodiment of the present invention.

The term "continuously" used here can be defined as the mode of addition of a relevant catalyst or reactant such that an essentially continuous effective concentration of the DMC catalyst or the reactant is maintained. The catalyst can be fed in in a truly continuous manner or in relatively tightly spaced increments. Equally, continuous addition of starter can be effected in a truly continuous manner or in increments. There would be no departure from the present process in adding a DMC catalyst or reactants incrementally such that the concentration of the materials added drops essentially to zero for a period prior to the next incremental addition. However, it is preferable that the DMC catalyst concentration is kept essentially at the same concentration during the main portion of the procedure of the continuous reaction, and that starter substance is present during the main portion of the copolymerization process. Incremental addition of DMC catalyst and/or reactant that does not significantly affect the characteristics of the product is nevertheless "continuous" in that sense in which the term is used here. It is possible, for example, to provide a recycling loop in which a portion of the reacting mixture is recycled to a prior point in the process, which smooths out discontinuities caused by incremental additions.

Step (δ)

Optionally, in a step (δ), the reaction mixture continuously removed in step (γ) can be transferred into a postreactor in which, by way of a postreaction, the content of free alkylene oxide is reduced to less than 0.05% by weight in the reaction mixture. The postreactor used may, for example, be a tubular reactor, a loop reactor or a stirred tank.

Preferably, the pressure in this postreactor is at the same pressure as in the reaction apparatus in which reaction step (γ) is conducted. However, the pressure chosen in the downstream reactor may also be higher or lower. In a further preferred embodiment, the carbon dioxide is fully or partly discharged after reaction step (γ) and the downstream reactor is operated at standard pressure or a slightly elevated pressure. The temperature in the downstream reactor is preferably 50 to 150° C. and more preferably 80 to 140° C.

The polyether carbonate polyols obtained in accordance with the invention have a functionality of, for example, at least 1, preferably of 1 to 8, more preferably of 1 to 6 and most preferably of 2 to 4. The molecular weight is preferably 400 to 10 000 g/mol and more preferably 500 to 6000 g/mol.

Alkylene Oxides

In general, it is possible to use alkylene oxides (epoxides) having 2-24 carbon atoms for the process of the invention. The alkylene oxides having 2-24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Alkylene oxides used are preferably ethylene oxide and/or propylene oxide, especially propylene oxide.

H-Functional Starter Substance

Suitable H-functional starter substances ("starters") used may be compounds having alkoxylation-active hydrogen atoms and having a molar mass of 18 to 4500 g/mol, preferably of 62 to 500 g/mol and more preferably of 62 to 182 g/mol. The ability to use a starter having a low molar mass is a distinct advantage over the use of oligomeric starters prepared by means of a prior oxyalkylation. More particularly, economic viability is achieved, which is enabled by the omission of a separate oxyalkylation process.

Alkoxylation-active groups having active H atoms are for example —OH, —NH₂ (primary amines), —NH— (secondary amines), —SH, and —CO₂H, preference being given to —OH and —NH₂, particular preference being given to —OH. H-functional starter substances used are, for example, one or more compounds selected from the group consisting of mono- and polyhydric alcohols, polyfunctional amines, polyfunctional thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines, polytetrahydrofurans (e.g. PolyTHF® from BASF), polytetrahydrofuranamines, polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$ alkyl fatty acid esters containing an average of at least 2 OH groups per molecule. The $C_1$-$C_{24}$ alkyl fatty acid esters containing an average of at least 2 OH groups per molecule are, for example, commercially available products such as Lupranol Balance® (BASF AG), the Merginol® range (Hobum Oleochemicals GmbH), the Sovermol® range (Cognis Deutschland GmbH & Co. KG) and the Soyol® TM range (USSC Co.). Monofunctional starter substances used may be alcohols, amines, thiols and carboxylic acids. Monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, t-butylamine, pentylamine, hexylamine, aniline, aziridine, pyrrolidine, piperidine, morpholine. Monofunctional thiols used may be: ethanethiol, propane-1-thiol, propane-2-thiol, butane-1-thiol, 3-methylbutane-1-thiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, propane-1,3-diol, butane-1,4-diol, butene-1,4-diol, butyne-1,4-diol, neopentyl glycol, pentane-1,5-diol, methylpentanediols (for example 3-methylpentane-1,5-diol), hexane-1,6-diol, octane-1,8-diol, decane-1,10-diol, dodecane-1,12-diol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, in particular castor oil), and all modification products of these aforementioned alcohols with different amounts of ε-caprolactone.

The H-functional starter substances may also be selected from the substance class of the polyether polyols having a molecular weight $M_n$ in the range from 18 to 4500 g/mol and a functionality of 2 to 3. Preference is given to polyether polyols formed from repeat ethylene oxide and propylene oxide units, preferably having a proportion of 35% to 100% propylene oxide units, more preferably having a proportion of 50% to 100% propylene oxide units. These may be random copolymers, gradient copolymers, alternating or block copolymers formed from ethylene oxide and propylene oxide.

The H-functional starter substances may also be selected from the substance class of the polyester polyols. Polyester polyols used are at least difunctional polyesters. Polyester polyols preferably consist of alternating acid and alcohol units. Acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components used are, for example, ethanediol, propane-1,2-diol, propane-1,3-diol, butane-1,4-diol, pentane-1,5-diol, neopentyl glycol, hexane-1,6-diol, 1,4-bis(hydroxymethyl)cyclohexane, diethylene glycol, dipropylene glycol, trimethylolpropane, glycerol, pentaerythritol or mixtures of the alcohols mentioned. If the alcohol components used are dihydric or polyhydric polyether polyols, the result is polyester ether polyols which can likewise serve as starter substances for preparation of the polyether carbonate polyols.

In addition, H-functional starter substances used may be polycarbonatediols which are prepared, for example, by reaction of phosgene, dimethyl carbonate, diethyl carbonate or diphenyl carbonate and difunctional alcohols or polyester polyols or polyether polyols. Examples of polycarbonates can be found, for example, in EP-A 1359177.

In a further embodiment of the invention, it is possible to use polyether carbonate polyols as H-functional starter substances. More particularly, polyether carbonate polyols obtainable by the process according to the invention described here are used. For this purpose, these polyether carbonate polyols used as H-functional starter substances are prepared beforehand in a separate reaction step.

The H-functional starter substances generally have a functionality (i.e. number of hydrogen atoms that are active for the polymerization per molecule) of 1 to 8, preferably of 2 or 3. The H-functional starter substances are used either individually or as a mixture of at least two H-functional starter substances.

More preferably, the H-functional starter substances are one or more compounds selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol, polyether carbonate polyols having a molecular weight Mn in the range from 150 to 8000 g/mol with a functionality of 2 to 3, and polyether polyols having a molecular weight Mn in the range from 150 to 8000 g/mol with a functionality of 2 to 3.

The polyether carbonate polyols are prepared by catalytic addition of carbon dioxide and alkylene oxides onto H-functional starter substances. "H-functional" in the context of the invention is understood to mean the number of hydrogen atoms that are active for the alkoxylation per molecule of the starter substance.

Preferably, the one or more H-functional starter substances that are metered continuously into the reactor during the reaction contain at least 1000 ppm, more preferably 1000 ppm to 10 000 ppm, of component K.

DMC Catalysts

DMC catalysts for use in the homopolymerization of alkylene oxides are known in principle from the prior art (see, for example, U.S. Pat. No. 3,404,109, U.S. Pat. No. 3,829,505, U.S. Pat. No. 3,941,849 and U.S. Pat. No. 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity and enable the preparation of polyether carbonate polyols at very low catalyst concentrations, such that a removal of the catalyst from the finished product is in some cases no longer required. An example of a DMC catalyst used is a metal complex catalyst based on the metals zinc and cobalt. For example, highly active DMC catalysts contain a double metal cyanide compound (e.g. zinc hexacyanocobaltate (III)), an organic complex ligand (e.g. tert-butanol) and polyether polyol having a number-average molecular weight greater than 500 g/mol; such DMC catalysts are described, for example, in EP-A 700 949.

Suitable DMC catalysts are preferably obtained by
(i) in the first step reacting an aqueous solution of a metal salt with the aqueous solution of a metal cyanide salt in the presence of one or more organic complex ligands, for example of an ether or alcohol,
(ii) in the second step separating the solids from the suspension obtained in (i) by known techniques (such as centrifugation or filtration),
(iii) in a third step optionally washing the isolated solids with an aqueous solution of an organic complex ligand (for example by resuspension and subsequent reisolation by filtration or centrifugation),
(iv) then drying the solids obtained at temperatures of generally 20-120° C. and at pressures of generally 0.1 mbar to atmospheric pressure (1013 mbar), optionally after pulverizing,
and by, in the first step or immediately after the precipitation of the double metal cyanide compound (second step), adding one or more organic complex ligands, preferably in excess (based on the double metal cyanide compound) and optionally further complex-forming components.

The double metal cyanide compounds present in the DMC catalysts are the reaction products of water-soluble metal salts and water-soluble metal cyanide salts.

For example, an aqueous solution of zinc chloride (preferably in excess based on the metal cyanide salt, for example potassium hexacyanocobaltate) and potassium hexacyanocobaltate are mixed and then dimethoxyethane (glyme) or tert-butanol (preferably in excess, based on zinc hexacyanocobaltate) is added to the suspension formed.

Metal salts suitable for preparation of the double metal cyanide compounds preferably have the general formula (II)

$$M(X)_n \qquad\qquad (II)$$

where

M is selected from the metal cations $Zn^{2+}$, $Fe^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate and
n is 2 when X=halide, hydroxide, carboxylate, cyanate, thiocyanate, isocyanate, isothiocyanate or nitrate,
or suitable metal salts have the general formula (III)

$$M_r(X)_3 \qquad\qquad (III)$$

where

M is selected from the metal cations $Fe^{3+}$, $Al^{3+}$, $Co^{3+}$ and $Cr^{3+}$, X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate and
r is 1 when X=halide, hydroxide, carboxylate, cyanate, thiocyanate, isocyanate, isothiocyanate or nitrate,
or suitable metal salts have the general formula (IV)

$$M(X)_s \qquad\qquad (IV)$$

where

M is selected from the metal cations $Mo^{4+}$, $V^{4+}$ and $W^{4+}$,

X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate and
s is 4 when X=halide, hydroxide, carboxylate, cyanate, thiocyanate, isocyanate, isothiocyanate or nitrate,
or suitable metal salts have the general formula (V)

$$M(X)_t \qquad\qquad (V)$$

where

M is selected from the metal cations $Mo^{6+}$ and $W^{6+}$,

X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (VI)

$$(Y)_a M'(CN)_b (A)_c \qquad\qquad (VI)$$

where

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate and a, b and c are integers, where the values of a, b and c are selected so as to give the electrically neutral metal cyanide salt; a is preferably 1, 2, 3 or 4; b is preferably 4, 5 or 6; c preferably has the value of 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds present in the DMC catalysts are compounds of the general formula (VII)

$$M_x[M'_{x'}(CN)_y]_z \qquad\qquad (VII)$$

in which M is defined as in formula (II) to (V) and
M' is as defined in formula (VI), and
x, x', y and z are integers and are chosen so as to give the electrically neutral double metal cyanide compound.

Preferably,
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8 lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086. For example, organic complex ligands used are water-soluble organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, triethylene glycol mono-tert-butyl ether, tripropylene glycol monomethyl ether and 3-methyl-3-oxetanemethanol). Most preferred organic complex ligands are selected from one or more compounds from the group consisting of dimethoxyethane, tert-butanol, 2-methyl-3-buten-2-ol, 2-methyl-3-butyn-2-ol, ethylene glycol mono-tert-butyl ether and 3-methyl-3-oxetanemethanol.

Optionally, in the preparation of the DMC catalysts, one or more complex-forming component(s) from the compound classes of the polyethers, polyesters, polycarbonates, polyalkylene glycol sorbitan esters, polyalkylene glycol glycidyl ethers, polyacrylamide, poly(acrylonitrile-co-acrylic acid), polyacrylic acid, poly(acrylic acid-co-maleic acid), polyacrylonitrile, polyalkylacrylates, polyalkylmethacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or the salts, esters or amides thereof, cyclodextrins, phosphorus compounds, α,β-unsaturated carboxylic esters or ionic surface- or interface-active compounds are used.

Preferably, in the preparation of the DMC catalysts, in the first step, the aqueous solutions of the metal salt (e.g. zinc chloride), used in a stoichiometric excess (at least 50 mol %) based on metal cyanide salt (i.e. at least a molar ratio of metal salt to metal cyanide salt of 2.25:1.00), and of the metal cyanide salt (e.g. potassium hexacyanocobaltate) are converted in the presence of the organic complex ligand (e.g. tert-butanol), forming a suspension containing the double metal cyanide compound (e.g. zinc hexacyanocobaltate), water, excess metal salt and the organic complex ligand. The organic complex ligand may be present in the aqueous solution of the metal salt and/or the metal cyanide salt, or it is added directly to the suspension obtained after precipitation of the double metal cyanide compound. It has been found to be advantageous to mix the aqueous solutions of the metal salt and the metal cyanide salt and the organic complex ligands with vigorous stirring. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser as described in WO-A 01/39883.

In the second step, the solids (i.e. the precursor of the catalyst of the invention) are isolated from the suspension by known techniques, such as centrifugation or filtration.

In a preferred variant, the isolated solids, in a third process step, are then washed with an aqueous solution of the organic complex ligand (for example by resuspension and subsequent reisolation by filtration or centrifugation). In this way, it is possible, for example, to remove water-soluble by-products, such as potassium chloride, from the catalyst. Preferably, the amount of the organic complex ligand in the aqueous wash solution is between 40% and 80% by weight, based on the overall solution.

Optionally, in the third step, further complex-forming component is added to the aqueous wash solution, preferably in the range between 0.5% and 5% by weight, based on the overall solution.

It is also advantageous to wash the isolated solids more than once. Preferably, in a first wash step (iii-1), washing is effected with an aqueous solution of the organic complex ligand (for example by resuspension and subsequent reisolation by filtration or centrifugation), in order in this way to remove, for example, water-soluble by-products, such as potassium chloride, from the catalyst. More preferably, the amount of the organic complex ligand in the aqueous wash solution is between 40% and 80% by weight, based on the overall solution for the first wash step. In the further wash steps (iii-2), either the first wash step is repeated once or more than once, preferably once to three times, or preferably a nonaqueous solution, for example a mixture or solution of organic complex ligands and further complex-forming component (preferably in the range between 0.5% and 5% by weight, based on the total amount of the wash solution of step (iii-2)), is used as wash solution to wash the solids once or more than once, preferably once to three times.

The isolated and optionally washed solid is subsequently dried at temperatures of generally 20-100° C. and at pressures of generally 0.1 mbar to atmospheric pressure (1013 mbar), optionally after pulverizing.

A preferred process for isolation of the DMC catalysts from the suspension by filtration, filtercake washing and drying is described in WO-A 01/80994.

As well as the DMC catalysts based on zinc hexacyanocobaltate ($Zn_3[Co(CN)_6]_2$) that are used with preference, it is also possible to use other metal complex catalysts based on the metals zinc and/or cobalt that are known to those skilled in the art from the prior art for the copolymerization or epoxides and carbon dioxide for the process of the invention. This especially includes what are called zinc glutarate catalysts (described, for example, in M. H. Chisholm et al., Macromolecules 2002, 35, 6494), what are called zinc diiminate catalysts (described, for example, in S. D. Allen, J. Am. Chem. Soc. 2002, 124, 14284), what are called cobalt salen catalysts (described, for example, in U.S. Pat. No. 7,304,172 B2, US 2012/0165549 A1)) and bimetallic zinc complexes with macrocyclic ligands (described, for example, in M. R. Kember et al., Angew. Chem., Int. Ed., 2009, 48, 931).

Component K

Compounds suitable as component K are characterized in that they contain at least one phosphorus-oxygen bond. Examples of suitable components K are phosphoric acid and phosphoric salts, phosphoryl halides, phosphoramides, phosphoric esters and salts of the mono- and diesters of phosphoric acid.

In the context of the invention the esters cited as possible components K hereinabove and hereinbelow are to be understood as meaning in each case the alkyl ester, aryl ester and/or alkaryl ester derivatives.

Examples of suitable phosphoric esters include mono-, di- or triesters of phosphoric acid, mono-, di-, tri- or tetraesters of pyrophosphoric acid and mono-, di-, tri-, tetra- or polyesters of polyphosphoric acid with alcohols having 1 to 30 carbon atoms. Examples of compounds suitable as component K include: triethyl phosphate, diethyl phosphate, monoethyl phosphate, tripropyl phosphate, dipropyl phosphate, monopropyl phosphate, tributyl phosphate, dibutyl phosphate, monobutyl phosphate, trioctyl phosphate, tris(2-ethylhexyl) phosphate, tris(2-butoxyethyl) phosphate, diphenyl phosphate, dicresyl phosphate, fructose 1,6-biphosphate, glucose 1-phosphate, bis(dimethylamido)phosphoric chloride, bis(4-nitrophenyl) phosphate, cyclopropylmethyl diethyl phosphate, dibenzyl phosphate, diethyl 3-butenyl phosphate, dihexadecyl phosphate, diisopropyl chlorophosphate, diphenyl phosphate, diphenyl chlorophosphate, 2-hydroxyethyl methacrylate phosphate, mono(4-chlorophenyl) dichlorophosphate, mono(4-nitrophenyl) dichlorophosphate, monophenyl dichlorophosphate, tridecyl phosphate, tricresyl phosphate, trimethyl phosphate, triphenyl phosphate, phosphoric acid tripyrolidide, phosphorus sulfochloride, dimethylamidophosphoric dichloride, methyl dichlorophosphate, phosphoryl bromide, phosphoryl chloride, phosphoryl quinoline chloride calcium salt and O-phosphorylethanolamine, alkali metal and ammonium dihydrogenphosphates, alkali metal, alkaline earth metal and ammonium hydrogenphosphates, alkali metal, alkaline earth metal and ammonium phosphates.

The term "esters of phosphoric acid" (phosphoric esters) is understood also to include the products obtainable by propoxylation of phosphoric acid (available as Exolit® OP 560 for example).

Also suitable as component K are phosphonic acid and phosphorous acid and also mono- and diesters of phosphonic acid and mono-, di- and triesters of phosphorous acid and their respective salts, halides and amides.

Examples of suitable phosphonic esters include mono- or diesters of phosphonic acid, alkylphosphonic acids, arylphosphonic acids, alkoxycarbonylalkylphosphonic acids, alkoxycarbonylphosphonic acids, cyanoalkylphosphonic acids and cyanophosphonic acids or mono-, di-, tri- or tetraesters of alkyldiphosphonic acids with alcohols having 1 to 30 carbon atoms. Examples of suitable phosphorous esters include mono-, di- or triesters of phosphorous acid with alcohols having 1 to 30 carbon atoms. This includes, for example, phenylphosphonic acid, butylphosphonic acid, dodecylphosphonic acid, ethylhexylphosphonic acid, octylphosphonic acid, ethylphosphonic acid, methylphosphonic acid, octadecylphosphonic acid and the mono- and dimethyl, -ethyl, -butyl, -ethylhexyl or -phenyl esters thereof, dibutyl butylphosphonate, dioctyl phenylphosphonate, triethyl phosphonoformate, trimethyl phosphonoacetate, triethyl phosphonoacetate, trimethyl 2-phosphonopropionate, triethyl 2-phosphonopropionate, tripropyl 2-phosphonopropionate, tributyl 2-phosphonopropionate, triethyl 3-phosphonopropionate, triethyl 2-phosphonobutyrate, triethyl 4-phosphonocrotonate, (12-phosphonododecyl)phosphonic acid, phosphonoacetic acid, methyl P,P-bis(2,2,2-trifluoroethyl)phosphonoacetate, trimethylsilyl P,P-diethylphosphonoacetate, tert-butyl P,P-dimethylphosphonoacetate, dimethyl P,P-phosphonoacetate potassium salt, ethyl P,P-dimethylphosphonoacetate, 16-phosphonohexadecanoic acid, 6-phosphonohexanoic acid, N-(phosphonomethyl)glycine, N-(phosphonomethyl)glycine monoisopropylamine salt, N-(phosphonomethyl)iminodiacetic acid, (8-phosphonooctyl)phosphonic acid, 3-phosphonopropionic acid, 11-phosphonoundecanoic acid, pinacol phosphonate, trilauryl phosphite, tris(3-ethyloxetanyl-3-methyl) phosphite, heptakis(dipropylene glycol) phosphite, 2-cyanoethyl N,N-diisopropylphosphoramidate, methyl N,N-diisopropylphosphoramidate, dibutyl phosphite, dibenzyl N,N-diethylphosphoramidate, di-tert-butyl N,N-diethylphosphoramidate, diethyl phosphite, diallyl N,N-diisopropylphosphoramidate, dibenzyl N,N-diisopropylphosphoramidate, di-tert-butyl N,N-diisopropylphosphoramidate, dimethyl N,N-diisopropylphosphoramidate, dibenzyl N,N-dimethylphosphoramidate, dimethyl phosphite, dimethyl trimethylsilyl phosphite, diphenyl phosphite, methyl dichlorophosphite, mono(2-cyanoethyl) N,N-diisopropylchlorophosphoramidate, o-phenylene phosphorochloridate, tributyl phosphite, triethyl phosphite, triisopropyl phosphite, triphenyl phosphite, tris(tert-butyldimethylsilyl) phosphite, tris(1,1,1,3,3,3-hexafluoro-2-propyl) phosphite, tris(trimethylsilyl) phosphite, dibenzyl phosphite. The term "esters of phosphorous acid" is also understood to include the products obtainable by propoxylation of phosphorous acid (available as Exolit® OP 550 for example).

Also suitable as component K are phosphinic acid, phosphonous acid and phosphinous acid and their respective esters. Examples of suitable phosphinic esters include esters of phosphinic acid, alkylphosphinic acids, dialkylphosphinic acids or arylphosphinic acids with alcohols having 1 to 30 carbon atoms. Examples of suitable phosphonous esters include mono- and diesters of phosphonous acid or arylphosphonous acid with alcohols having 1 to 30 carbon atoms. This includes, for example, diphenylphosphinic acid or 9,10-dihydro-9-oxa-10-phosphaphenanthrene 10-oxide.

The esters of phosphoric acid, phosphonic acid, phosphorous acid, phosphinic acid, phosphonous acid or phosphinous acid suitable as component K are generally obtained by reaction of phosphoric acid, pyrophosphoric acid, polyphosphoric acids, phosphonic acid alkylphosphonic acids, arylphosphonic acids, alkoxycarbonylalkylphosphonic acids, alkoxycarbonylphosphonic acids, cyanoalkylphosphonic acids, cyanophosphonic acid, alkyldiphosphonic acids, phosphonous acid, phosphorous acid, phosphinic acid, phosphinous acid or the halogen derivatives or phosphorus oxides thereof with hydroxyl compounds having 1 to 30 carbon atoms, such as methanol, ethanol, propanol, butanol, pentanol, hexanol, heptanol, octanol, nonanol, decanol, dodecanol, tridecanol, tetradecanol, pentadecanol, hexadecanol, heptadecanol, octadecanol, nonadecanol, methoxymethanol, ethoxymethanol, propoxymethanol, butoxymethanol, 2-ethoxyethanol, 2-propoxyethanol, 2-butoxyethanol, phenol, ethyl hydroxyacetate, propyl hydroxyacetate, ethyl hydroxypropionate, propyl hydroxypropionate, ethane-1,2-diol, propane-1,2-diol, 1,2,3-trihydroxypropane, 1,1,1-trimethylolpropane or pentaerythritol.

Phosphine oxides suitable as component K contain one or more alkyl, aryl or aralkyl groups having 1-30 carbon atoms bonded to the phosphorus. Preferred phosphine oxides have the general formula $R_3P=O$ where R is an alkyl, aryl or aralkyl group having 1-20 carbon atoms. Examples of suitable phosphine oxides include trimethylphosphine oxide, tri(n-butyl)phosphine oxide, tri(n-octyl)phosphine oxide, triphenylphosphine oxide, methyldibenzylphosphine oxide and mixtures thereof.

Also suitable as component K are compounds of phosphorus that can form one or more P—O bond(s) by reaction with OH-functional compounds (such as water or alcohols for example).

Examples of such compounds of phosphorus that are useful include phosphorus(V) sulfide, phosphorus tribromide, phosphorus trichloride and phosphorus triiodide.

It is also possible to employ any desired mixtures of the abovementioned compounds as component K.

In one embodiment of the invention, component K is selected from at least one compound from the group consisting of phosphoric acid, phosphonic acid, phosphorous acid, phosphinic acid, phosphonous acid, phosphinous acid, phosphine oxides, and salts, esters, halides and amides of phosphoric acid, phosphonic acid, phosphorous acid, phosphinic acid, phosphonous acid, phosphinous acid, phosphorus(V) sulfide, phosphorus tribromide, phosphorus trichloride and phosphorus triiodide.

Preferably, component K is selected from at least one compound from the group consisting of
  phosphoric acid,
  mono-, di- or trialkyl esters of phosphoric acid,
  mono-, di- or triaryl esters of phosphoric acid,
  mono-, di- or trialkaryl esters of phosphoric acid,
  $(NH_4)_2HPO_4$,
  phosphonic acid,
  mono- or dialkyl esters of phosphonic acid,
  mono- or diaryl esters of phosphonic acid,
  mono- or dialkaryl esters of phosphonic acid,
  phosphorous acid,
  mono-, di- or trialkyl esters of phosphorous acid,
  mono-, di- or triaryl esters of phosphorous acid,
  mono-, di- or trialkaryl esters of phosphorous acid,
  phosphinic acid,
  phosphonous acid and
  phosphinous acid.

More preferably, component K is phosphoric acid.

After performance of the process according to the invention for preparing the polyether carbonate polyol, the resulting reaction mixture generally comprises the DMC catalyst in the form of finely dispersed solid particles. It may therefore be desirable to remove the DMC catalyst from the resulting reaction mixture as completely as possible. The removal of the DMC catalyst has the advantage that the resulting polyether carbonate polyol achieves industry- or certification-relevant limits for example in terms of metal contents or in terms of emissions that otherwise result from activated catalyst remaining in the product and also facilitates recovery of the DMC catalyst.

The DMC catalyst may be removed to the greatest possible extent or completely using various methods. The DMC catalyst may be removed from the polyether carbonate polyol, for example, using membrane filtration (nanofiltration, ultrafiltration or crossflow filtration), using cake filtration, using precoat filtration or by centrifugation.

Removal of the DMC catalyst is preferably effected using a multistage process consisting of at least two steps.

For example, in a first step the reaction mixture to be filtered is subjected to a first filtration step where it is divided into a relatively large substream (filtrate) which has had a large proportion of the catalyst or all of the catalyst removed from it and a relatively small residual stream (retentate) which comprises the catalyst removed. The residual stream is then subjected to a dead end filtration in a second step. This affords a further filtrate stream where a large proportion of the catalyst or all of the catalyst has been removed and a damp to practically dry catalyst residue.

Alternatively, the catalyst comprised in the polyether carbonate polyol may be subjected to a first step comprising adsorption, agglomeration/coagulation and/or flocculation followed by a second or a plurality of subsequent steps comprising the removal of the solid phase from the polyether carbonate polyol. Suitable adsorbents for mechanical-physical and/or chemical adsorption comprise, inter alia, activated or nonactivated aluminas and fuller's earths (sepiolite, montmorillonite, talc etc.), synthetic silicates, activated carbon, silicas/diatomaceous earths and activated silicas/diatomaceous earths in typical amount ranges of from 0.1% by weight to 2% by weight, preferably 0.8% by weight to 1.2% by weight, based on the polyether carbonate polyol at temperatures of from 60° C. to 140° C., preferably 90° C. to 110° C., and residence times of from 20 min to 100 min, preferably 40 min to 80 min, it being possible to carry out the adsorption step, including blending of the adsorbent, in batchwise or continuous fashion.

A preferred process for removing this solid phase (consisting, for example, of adsorbent and DMC catalyst) from the polyether carbonate polyol is precoat filtration. Here, depending on the filtration behavior which is determined by the particle size distribution of the solid phase to be removed, the average specific resistance of the resulting filtercake and the total resistance of the precoat layer and filtercake, the filter surface is coated with a permeable filtration aid (for example inorganic: Celite, perlite; organic: cellulose) with a layer thickness of from 20 mm to 250 mm, preferably 100 mm to 200 mm ("pre-coat"). The majority of the solid phase (consisting, for example, of adsorbent and DMC catalyst) is removed at the surface of the precoat layer in combination with depth filtration of the smaller particles within the precoat layer. The temperature of the crude product to be filtered is in the range from 50° C. to 120° C., preferably 70° C. to 100° C.

In order to ensure a sufficient flow of product through the precoat layer and the cake layer growing thereupon, the cake layer and a small part of the precoat layer may be removed using a scraper or blade (periodically or continuously) and removed from the process. The adjustment of this scraper/blade is performed at minimum advancement rates of about 20 µm/min-500 µm/min, preferably in the range 50 µm/min-150 µm/min.

As soon as the precoat layer has been practically or completely removed by this process, the filtration is stopped and a new precoat layer is applied to the filter surface. Here, the filtration aid may be suspended in, for example, cyclic propylene carbonate.

This precoat filtration is typically carried out in vacuum-drum filters. In order to realize industrially relevant filtrate flow rates in the range of from 0.1 m³/(m²·h) to 5 m³/(m²·h) in the case of a viscous feed stream the drum filter may also be implemented as a pressure-drum filter with pressure differences of up to 6 bar or more between the medium to be filtered and the filtrate side.

In principle, the DMC catalyst may be removed from the resulting reaction mixture from the process according to the invention either before removal of volatile constituents (for example cyclic propylene carbonate) or after removal of volatile constituents.

The removal of the DMC catalyst from the resulting reaction mixture from the process according to the invention may moreover be carried out with or without the further addition of a solvent (in particular cyclic propylene carbonate) to reduce the viscosity before or during the individual cited catalyst removal steps.

In a first embodiment, the invention thus relates to a process for preparing polyether carbonate polyols by adding alkylene oxides and carbon dioxide onto one or more H-functional starter substances in the presence of a double metal cyanide (DMC) catalyst, characterized in that (γ) one or more H-functional starter substances and DMC catalyst are metered continuously into the reactor during the addition, and the free alkylene oxide concentration in the reaction mixture is from 1.5% to 5.0% by weight, and the resulting reaction mixture is removed continuously from the reactor.

In a second embodiment, the invention relates to a process according to the first embodiment, wherein the free alkylene oxide concentration during the addition in step (γ) is from 1.5% to 4.5% by weight.

In a third embodiment, the invention relates to a process according to the first embodiment, wherein the free alkylene oxide concentration during the addition in step (γ) is from 2.0% to 4.0% by weight.

In a fourth embodiment, the invention relates to a process according to any of embodiments 1 to 3, wherein the H-functional starter substances used in step (γ) contain at least 1000 ppm of component K, where component K is selected from at least one compound containing a phosphorus-oxygen bond and a compound of phosphorus which can form one or more P—O bond(s) by reaction with OH-functional compounds.

In a fifth embodiment, the invention relates to a process according to the fourth embodiment, wherein the H-functional starter substances used in step (γ) contain from 1000 ppm to 10 000 ppm of component K.

In a sixth embodiment, the invention relates to a process according to either of embodiments 4 and 5, wherein component K is selected from at least one compound from the group consisting of phosphoric acid, phosphonic acid, phosphorous acid, phosphinic acid, phosphonous acid, phosphinous acid, phosphine oxides, salts of phosphoric acid, esters of phosphoric acid, halides of phosphoric acid, amides of phosphoric acid, phosphonic acid, phosphorous acid, phosphinic acid, phosphonous acid and phosphinous acid, phosphorus(V) sulfide, phosphorus tribromide, phosphorus trichloride and phosphorus triiodide.

In a seventh embodiment, the invention relates to a process according to either of embodiments 4 and 5, wherein component K is selected from at least one compound of the group consisting of phosphoric acid, mono-, di- or trialkyl esters of phosphoric acid, mono-, di- or triaryl esters of phosphoric acid, mono-, di- or trialkaryl esters of phosphoric acid, $(NH_4)_2HPO_4$, phosphonic acid, mono or dialkyl esters of phosphonic acid, mono- or diaryl esters of phosphonic acid, mono-, or dialkaryl esters of phosphonic acid, phosphorous acid, mono-, di- or trialkyl esters of phosphorous acid, mono-, di- or triaryl esters of phosphorous acid, mono-, di- or trialkaryl esters of phosphorous acid, phosphinic acid, phosphonous acid and phosphinous acid.

In an eighth embodiment, the invention relates to a process according to either of embodiments 4 and 5, wherein component K is phosphoric acid.

In a ninth embodiment, the invention relates to a process according to any of embodiments 1 to 8, wherein step (γ) is preceded by initial charging, in a step (α), of a portion of the H-functional starter substances and/or a suspension medium containing no H-functional groups in a reactor, in each case optionally together with DMC catalyst.

In a tenth embodiment, the invention relates to a process according to the ninth embodiment, wherein at least one suspension medium is used in step (α), selected from the group consisting of 4-methyl-2-oxo-1,3-dioxolane, 1,3-dioxolan-2-one, acetone, methyl ethyl ketone, acetonitrile, nitromethane, dimethyl sulfoxide, sulfolane, dimethylformamide, dimethylacetamide, N-methylpyrrolidone, dioxane, diethyl ether, methyl tert-butyl ether, tetrahydrofuran, ethyl acetate, butyl acetate, pentane, n-hexane, benzene, toluene, xylene, ethylbenzene, chloroform, chlorobenzene, dichlorobenzene, carbon tetrachloride, ε-caprolactone, dihydrocoumarin, trimethylene carbonate, neopentyl glycol carbonate, 3,6-dimethyl-1,4-dioxane-2,5-dione, succinic anhydride, maleic anhydride and phthalic anhydride.

In an eleventh embodiment, the invention relates to a process according to either of embodiments 9 and 10, wherein step (α) is followed and step (γ) is preceded by (β) adding a portion of alkylene oxide to the mixture from step (α) at temperatures of 90 to 150° C., in which case the addition of the alkylene oxide compound is interrupted.

In a twelfth embodiment, the invention relates to a process according to any of embodiments 1 to 11, wherein (δ) the reaction mixture continuously removed in step (γ) is transferred into a postreactor in which, by way of a postreaction, the content of free alkylene oxide is reduced to less than 0.05% by weight in the reaction mixture.

In a thirteenth embodiment, the invention relates to a process according to any of embodiments 1 to 12, wherein the one or more H-functional starter substances are selected from at least one of the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol, polyether carbonate polyols having a molecular weight Mn in the range from 150 to 8000 g/mol with a functionality of 2 to 3, and polyether polyols having a molecular weight Mn in the range from 150 to 8000 g/mol with a functionality of 2 to 3.

In a fourteenth embodiment, the invention relates to a process according to any of embodiments 1 to 13, wherein, in step (γ), the one or more H-functional starter substances are selected from at least one of the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane and pentaerythritol.

In a fifteenth embodiment, the invention relates to a process for preparing polyether carbonate polyols by adding alkylene oxides and carbon dioxide onto one or more H-functional starter substances in the presence of a metal complex catalyst based on the metals zinc and/or cobalt, characterized in that (γ) one or more H-functional starter substances and metal complex catalyst based on the metals zinc and/or cobalt are metered continuously into the reactor during the addition, and the free alkylene oxide concentration in the reaction mixture is from 1.5% to 5.0% by weight, and the resulting reaction mixture is removed continuously from the reactor.

The polyether carbonate polyols obtainable by the process according to the invention can be processed without difficulty, especially by reaction with di- and/or polyisocyanates to give polyurethanes, especially to give flexible polyurethane foams (for example flexible slabstock polyurethane foams and flexible molded polyurethane foams), polyurethane elastomers, polyurethane thermoplastics, rigid polyurethane foams, polyurethane-based paint raw materials and polyurethane-based coatings. For polyurethane applications, it is preferable to use polyether carbonate polyols based on an H-functional starter substance having a functionality of at least 2. In addition, the polyether carbonate polyols obtainable by the process of the invention can be used in applications such as washing and cleaning composition formulations, drilling fluids, fuel additives, ionic and nonionic surfactants, lubricants, process chemicals for papermaking or textile manufacture, or cosmetic formulations. The person skilled in the art is aware that, depending on the respective field of use, the polyether carbonate polyols to be used have to fulfill certain physical properties, for example molecular weight, viscosity, functionality and/or hydroxyl number.

The invention thus provides a process for preparing polyether carbonate polyols by adding alkylene oxides and carbon dioxide onto one or more H-functional starter substances in the presence of a double metal cyanide (DMC) catalyst, characterized in that (γ) one or more H-functional starter substances and DMC catalyst are metered continuously into the reactor during the addition, and the free alkylene oxide concentration in the reaction mixture is from 1.5% to 5.0% by weight, and the resulting reaction mixture is removed continuously from the reactor.

This process regime, in which one or more H-functional starter substances and DMC catalyst are metered continuously into the reactor during the addition, is also referred to as continuous CAOS process.

EXAMPLES

Feedstocks:
The DMC catalyst used in all examples was DMC catalyst prepared according to example 6 in WO 01/80994 A1.

Test Methods:
Experimentally determined OH numbers were determined by the method of DIN 53240.

The number-average molecular weight $M_n$ and the weight-average molecular weight $M_w$, and also the polydispersity ($M_w/M_n$), of the products was determined by means of gel permeation chromatography (GPC). The procedure was according to DIN 55672-1: "Gel permeation chromatography, Part 1—Tetrahydrofuran as eluent" (SECurity GPC System from PSS Polymer Service, flow rate 1.0 ml/min; columns: 2× PSS SDV linear M, 8×300 mm, 5 μm; RID detector). Polystyrene samples of known molar mass were used for calibration.

The free PO content that results in the steady state in the reaction mixture during the copolymerization was determined by means of online IR spectroscopy (from Bruker Optik GmbH, Matrix-MF ex-proof, method according to manufacturer's instructions, calibration of individual materials).

The proportion of $CO_2$ incorporated in the resulting polyether carbonate polyol ("$CO_2$ incorporated") and the ratio of propylene carbonate to polyether carbonate polyol were determined by NMR (Bruker DPX 400, 400 MHz; pulse program zg30, relaxation delay d1: 10 s, 64 scans). Each sample was dissolved in deuterated chloroform. The relevant resonances in the NMR (based on TMS=0 ppm) are as follows:

cyclic carbonate (which was formed as a by-product) resonance at 4.5 ppm, carbonate resulting from carbon dioxide incorporated in the polyether carbonate polyol (resonances at 5.1 to 4.8 ppm), unreacted PO with resonance at 2.4 ppm, polyether polyol (i.e. without incorporated carbon dioxide) having resonances at 1.2 to 1.0 ppm.

The mole fraction of the carbonate incorporated in the polymer in the reaction mixture is calculated as per formula (VIII) as follows, using the following abbreviations:

A(4.5)=area of the resonance at 4.5 ppm for cyclic carbonate (corresponds to an H atom)

A(5.1-4.8)=area of the resonance at 5.1-4.8 ppm for polyether carbonate polyol and an H atom for cyclic carbonate A(2.4)=area of the resonance at 2.4 ppm for free, unreacted PO A(1.2-1.0)=area of the resonance at 1.2-1.0 ppm for polyether polyol Taking account of the relative intensities, the values for the polymer-bound carbonate ("linear carbonate" LC) in the reaction mixture were converted to mol % as per the following formula (VIII):

$$LC = \frac{A(5.1-4.8) - A(4.5)}{A(5.1-4.8) + A(2.4) + 0.33*A(1.2-1.0)} * 100 \qquad (VIII)$$

The proportion by weight (in % by weight) of polymer-bound carbonate (LC') in the reaction mixture was calculated by formula (IX):

$$LC' = \frac{[A(5.1-4.8) - A(4.5)]*102}{D} * 100\% \qquad (IX)$$

where the value of D ("denominator" D) is calculated by formula (X):

$$D=[A(5.1-4.8)-A(4.5)]*102+A(4.5)*102+A(2.4)*58+ \\ 0.33*A(1.2-1.0)*58$$

The factor of 102 results from the sum of the molar masses of $CO_2$ (molar mass 44 g/mol) and of propylene oxide (molar mass 58 g/mol); the factor of 58 results from the molar mass of propylene oxide.

The proportion by weight (in % by weight) of cyclic carbonate (CC') in the reaction mixture was calculated by formula (XI):

$$CC' = \frac{A(4.5)*102}{D} * 100\% \qquad (XI)$$

where the value of D is calculated by formula (X).

In order to calculate the composition based on the polymer component (consisting of polyether which has been formed from propylene oxide during the activation steps which take place under $CO_2$-free conditions, and polyether carbonate polyol formed from starter, propylene oxide and carbon dioxide during the activation steps which take place in the presence of $CO_2$ and during the copolymerization) from the values for the composition of the reaction mixture, the non-polymeric constituents of the reaction mixture (i.e. cyclic propylene carbonate and any unconverted propylene oxide present) were mathematically eliminated. The weight fraction of the repeat carbonate units in the polyether carbonate polyol was converted to a weight fraction of carbon dioxide using the factor F=44/(44+58). The figure for the $CO_2$ content in the polyether carbonate polyol ("$CO_2$ incorporated"; see examples which follow and table 1) is normalized to the polyether carbonate polyol molecule which has formed in the copolymerization and the activation steps.

The amount of propylene carbonate formed is determined via the mass balance of the total amount of propylene carbonate present in the reaction mixture and any amount of propylene carbonate used as the initial charge.

Example 1

Preparation of catalyst/starter mixture 1: 14.5 g of DMC catalyst were suspended in 1000 g of a starter mixture of monopropylene glycol/glycerol in a monopropylene glycol/glycerol weight ratio of 15/85, the starter mixture containing 180 ppm of $H_3PO_4$.

A nitrogen-purged 60 L pressure reactor with a gas metering unit (gas inlet tube) and product discharge tube was initially charged with a suspension of 14.9 g of DMC catalyst (prepared as per example 6 of WO 01/80994 A1) and 4700 g of cyclic propylene carbonate (cPC). The reactor was heated to about 100° C. and inertized with $N_2$ at a pressure $p_{abs}$=100 mbar for 1 h. The reactor was then adjusted to a pressure of 74 bar with $CO_2$. 500 g of propylene oxide (PO) were metered into the reactor at 110° C. while stirring (316 rpm) within 2 min. The onset of the reaction was signaled by a temperature spike ("hotspot") and a pressure drop. On completion of activation, propylene oxide at 6.6 kg/h and catalyst starter mixture 1 at 0.22 kg/h were metered simultaneously into the reactor. In the course of this, the reaction temperature was lowered to 105° C. and the reaction mixture was withdrawn from the reactor through the product discharge tube, keeping the fill level constant at a reaction volume Vr of 27.4 $dm^3$. To complete the reaction, the reaction mixture was conveyed through a heated tubular reactor (T=105° C.; reaction volume Vr 10.4 $dm^3$). The cyclic propylene carbonate was separated from the polyether carbonate polyol in a thin-film evaporator (T=140° C., $p_{abs}$<3 mbar, 400 rpm).

Table 1 below shows:
the free PO content that results in the steady state in the reaction mixture during the copolymerization,
the selectivity, i.e. the ratio of cyclic to linear carbonate formed during the copolymerization, and
analytical data for the resulting polyether carbonate polyol (content of $CO_2$ incorporated, the polydispersity and the hydroxyl number (OHN)).

Example 2

Preparation of catalyst/starter mixture 2: 7.0 g of DMC catalyst were suspended in 1000 g of monopropylene glycol.

A nitrogen-purged 60 L pressure reactor with a gas metering unit (gas inlet tube) and product discharge tube was initially charged with a suspension of 14.9 g of DMC catalyst (prepared as per example 6 of WO 01/80994 A1) and 4700 g of cyclic propylene carbonate (cPC). The reactor was heated to about 100° C. and inertized with $N_2$ at a pressure $n_{abs}$=100 mbar for 1 h. The reactor was then adjusted to a pressure of 74 bar with $CO_2$. 500 g of propylene oxide (PO) were metered into the reactor at 110° C. while stirring (316 rpm) within 2 min. The onset of the reaction was signaled by a temperature spike ("hotspot") and a pressure drop. On completion of activation, propylene oxide at 6.58 kg/h and catalyst starter mixture 2 at 0.31 kg/h were metered simultaneously into the reactor. In the course of this, the reaction temperature was lowered to 105° C. and the reaction mixture was withdrawn from the reactor through the product discharge tube, keeping the fill level constant at a reaction volume Vr of 27.4 $dm^3$. To complete the reaction, the reaction mixture was conveyed through a heated tubular reactor (T=105° C.; reaction volume Vr 10.4 $dm^3$). The cyclic propylene carbonate was separated from the polyether carbonate polyol in a thin-film evaporator (T=140° C., $p_{abs}$<3 mbar, 400 rpm).

Table 1 below shows:
the free PO content that results in the steady state in the reaction mixture during the copolymerization,
the selectivity, i.e. the ratio of cyclic to linear carbonate formed during the copolymerization, and
analytical data for the resulting polyether carbonate polyol (content of $CO_2$ incorporated, the polydispersity and the hydroxyl number (OHN)).

Comparative Example 3

A nitrogen-purged 60 L pressure reactor with a gas metering unit (gas inlet tube) was initially charged with a with suspension of 14.9 g of DMC catalyst (prepared as per example 6 of WO 01/80994 A1) and 4700 g of cyclic propylene carbonate (cPC). The reactor was heated to about 100° C. and inertized with $N_2$ at a pressure $p_{abs}$=100 mbar for 1 h. The reactor was then adjusted to a pressure of 74 bar with $CO_2$. 500 g of propylene oxide (PO) were metered into the reactor at 110° C. while stirring (316 rpm) within 2 min. The onset of the reaction was signaled by a temperature spike ("hotspot") and a pressure drop. On completion of activation, 33.58 kg of propylene oxide at 8.2 kg/h and 1.1 kg of a mixture of monopropylene glycol/glycerol in a weight ratio of 15/85 (with 180 ppm of $H_3PO_4$ having been added to the mixture) at 0.29 kg/h were metered simultaneously into the reactor at 105° C. By continuous further metered addition of $CO_2$ under closed-loop control, the pressure in the reactor was kept constant at 74 bar. After the addition of PO had ended, stirring at 316 rpm was continued at 105° C. and reaction pressure until the $CO_2$ consumption had abated. The cyclic propylene carbonate was separated from the polyether carbonate polyol by means of a thin-film evaporator (T=140° C., p<3 mbar, 400 rpm). The free PO content established in the reactor during the reaction was virtually constant.

Table 1 below shows:
the free PO content that results in the reaction mixture during the copolymerization,
the selectivity, i.e. the ratio of cyclic to linear carbonate formed during the copolymerization, and
analytical data for the resulting polyether carbonate polyol (content of $CO_2$ incorporated, the polydispersity and the hydroxyl number (OHN)).

Comparative Example 4

A nitrogen-purged 60 L pressure reactor with a gas metering unit (gas inlet tube) was initially charged with a with suspension of 14.25 g of DMC catalyst (prepared as per example 6 of WO 01/80994 A1) and 4700 g of cyclic propylene carbonate (cPC). The reactor was heated to about 100° C. and inertized with $N_2$ at a pressure $p_{abs}$=100 mbar for 1 h. The reactor was then adjusted to a pressure of 74 bar with $CO_2$. 560 g of propylene oxide (PO) were metered into the reactor at 110° C. while stirring (316 rpm) within 2 min. The onset of the reaction was signaled by a temperature spike ("hotspot") and a pressure drop. On completion of activation, 31.90 kg of propylene oxide at 7.6 kg/h and 1.5 kg of the monopropylene glycol starter at 0.40 kg/h were metered simultaneously into the reactor at 105° C. By continuous further metered addition of $CO_2$ under closed-loop control, the pressure in the reactor was kept constant at 74 bar. After the addition of PO had ended, stirring at 316 rpm was continued at 105° C. and reaction pressure until the $CO_2$ consumption had abated. The cyclic propylene carbonate was separated from the polyether carbonate polyol by means of a thin-film evaporator (T=140° C., p<3 mbar, 400 rpm). The free PO content established in the reactor during the reaction was virtually constant.

Table 1 below shows:
the free PO content that results in the reaction mixture during the copolymerization,
the selectivity, i.e. the ratio of cyclic to linear carbonate formed during the copolymerization, and
analytical data for the resulting polyether carbonate polyol (content of $CO_2$ incorporated, the polydispersity (PDI) and the hydroxyl number (OHN)).

Comparative Example 5

Preparation of catalyst/starter mixture 3: 85.9 g of DMC catalyst were suspended in 5000 g of a starter mixture of monopropylene glycol/glycerol in a monopropylene glycol/glycerol weight ratio of 15/85, the starter mixture containing 130 ppm of $H_3PO_4$.

A nitrogen-purged 60 L pressure reactor with a gas metering unit (gas inlet tube) and product discharge tube was initially charged with a suspension of 2.5 g of DMC catalyst (prepared as per example 6 of WO 01/80994 A1) and 4700 g of cyclic propylene carbonate (cPC). The reactor was heated to about 100° C. and inertized with $N_2$ at a pressure $p_{abs}$=100 mbar for 1 h. The reactor was then adjusted to a pressure of 74 bar with $CO_2$. 500 g of propylene oxide (PO) were metered into the reactor at 115° C. while stirring (316 rpm) within 2 min. The onset of the reaction was signaled by a temperature spike ("hotspot") and a pressure drop. On completion of activation, the reaction mixture was adjusted to a temperature of 105° C., and propylene oxide at 7.06 kg/h and catalyst/starter mixture 3 at 0.254 kg/h were metered simultaneously into the reactor. In the course of this, the reaction mixture was withdrawn continuously from the reactor through the product discharge tube, keeping the fill level constant at a reaction volume Vr of 27.4 dm³. To complete the reaction, the reaction mixture was conveyed through a heated tubular reactor (T=120° C.; reaction volume Vr 10.4 dm³). The cyclic propylene carbonate was separated from the polyether carbonate polyol in a thin-film evaporator (T=160° C., $p_{abs}$<3 mbar, 400 rpm).

Table 1 below shows:
the free PO content that results in the steady state in the reaction mixture during the copolymerization,
the selectivity, i.e. the ratio of cyclic to linear carbonate formed during the copolymerization, and
analytical data for the resulting polyether carbonate polyol (content of $CO_2$ incorporated, the polydispersity and the hydroxyl number (OHN)).

Comparative Example 6

Preparation of catalyst/starter mixture 4: 17.2 g of DMC catalyst were suspended in 5000 g of a starter mixture of monopropylene glycol/glycerol in a monopropylene glycol/glycerol weight ratio of 15/85, the starter mixture containing 130 ppm of $H_3PO_4$.

A nitrogen-purged 60 L pressure reactor with a gas metering unit (gas inlet tube) and product discharge tube was initially charged with a suspension of 0.5 g of DMC catalyst (prepared as per example 6 of WO 01/80994 A1) and 4700 g of cyclic propylene carbonate (cPC). The reactor was heated to about 100° C. and inertized with $N_2$ at a pressure $p_{abs}$=100 mbar for 1 h. The reactor was then adjusted to a pressure of 74 bar with $CO_2$. 500 g of propylene oxide (PO) were metered into the reactor at 115° C. while stirring (316 rpm) within 2 min. The onset of the reaction was signaled by a temperature spike ("hotspot") and a pressure drop. On completion of activation, the reaction mixture was adjusted to a temperature of 105° C., and propylene oxide at 7.06 kg/h and catalyst/starter mixture 4 at 0.254 kg/h were metered simultaneously into the reactor. In the course of this, the reaction mixture was withdrawn continuously from the reactor through the product discharge tube, keeping the fill level constant at a reaction volume Vr of 27.4 dm³. The free PO content in the reaction mixture rose constantly during the continuous metered addition of the reactants. Over and above a free PO content of 5.5% by weight, a stable process regime was no longer possible because of severe fluctuations in pressure and temperature. The experiment therefore had to be terminated.

Example 7

Preparation of catalyst/starter mixture 5: 34.5 g of DMC catalyst were suspended in 5000 g of a starter mixture of monopropylene glycol/glycerol in a monopropylene glycol/glycerol weight ratio of 15/85, the starter mixture containing 130 ppm of $H_3PO_4$.

A nitrogen-purged 60 L pressure reactor with a gas metering unit (gas inlet tube) and product discharge tube was initially charged with a suspension of 1.0 g of DMC catalyst (prepared as per example 6 of WO 01/80994 A1) and 4700 g of cyclic propylene carbonate (cPC). The reactor was heated to about 100° C. and inertized with $N_2$ at a pressure $p_{abs}$=100 mbar for 1 h. The reactor was then adjusted to a pressure of 74 bar with $CO_2$. 500 g of propylene oxide (PO) were metered into the reactor at 115° C. while stirring (316 rpm) within 2 min. The onset of the reaction was signaled by a temperature spike ("hotspot") and a pressure drop. On completion of activation, the reaction mixture was adjusted to a temperature of 105° C., and propylene oxide at 7.06 kg/h and catalyst/starter mixture 5 at 0.254 kg/h were metered simultaneously into the reactor. In the course of this, the reaction mixture was withdrawn continuously from the reactor through the product discharge tube, keeping the fill level constant at a reaction volume Vr of 27.4 dm³. To complete the reaction, the reaction mixture was conveyed through a heated tubular reactor (T=120° C.; reaction volume Vr 10.4 dm³). The cyclic propylene carbonate was separated from the polyether carbonate polyol in a thin-film evaporator (T=160° C., $p_{abs}$<3 mbar, 400 rpm).

Table 1 below shows:
the free PO content that results in the steady state in the reaction mixture during the copolymerization,
the selectivity, i.e. the ratio of cyclic to linear carbonate formed during the copolymerization, and
analytical data for the resulting polyether carbonate polyol (content of $CO_2$ incorporated, the polydispersity and the hydroxyl number (OHN)).

TABLE 1

Results of the polyether carbonate polyol preparation

| Example | Free PO content [% by wt.] | $CO_2$ incorporated [% by wt.] | Selectivity cyclic/linear | PDI | OHN [mg KOH/g] |
|---|---|---|---|---|---|
| 1 | 2.0 | 21.93 | 0.19 | 1.12 | 49.6 |
| 2 | 2.7 | 21.63 | 0.11 | 1.10 | 54.5 |
| 3*) | 2.0 | 20.40 | 0.18 | 1.11 | 52.0 |
| 4*) | 2.5 | 18.83 | 0.11 | 1.12 | 55.3 |
| 5*) | 1.1 | 19.7 | 0.44 | 1.09 | 56.5 |
| 6*) | 5.5 | — | — | — | — |
| 7 | 3.1 | 20.5 | 0.17 | 1.09 | 55.9 |

*)comparative example

It is apparent from the results shown in table 1 that, by virtue of the process of the invention ("continuous CAOS process"), which differs from the prior art in that DMC catalyst is metered in continuously as well, and the free alkylene oxide content during the copolymerization is kept within the inventive range, the content of $CO_2$ incorporated in the resulting polyether carbonate polyol is distinctly increased compared to the process from the prior art ("semi-batchwise CAOS process") (comparison of example 1 with comparative example 3 or example 2 with comparative example 4); the elevated incorporation of $CO_2$ is also manifested in that a higher mean molar mass of the resulting polyether carbonate polyol is attained and hence the resulting hydroxyl number is lower in each of the corresponding inventive examples (1 and 2) compared to the comparative examples (3 and 4).

A comparison of example 7 with comparative example 5 shows that, in the case of performance of the continuous CAOS process within the inventive range for the free alkylene oxide concentration, elevated incorporation of $CO_2$ and a much more favorable selectivity (i.e. lower ratio of cyclic to linear carbonate) are obtained than in the case of performance of the process below the inventive range for the free alkylene oxide concentration. Comparative example 6 shows that no stable process regime is possible above the inventive range for the free alkylene oxide concentration because of severe fluctuations in temperature and pressure.

The invention claimed is:

1. A process for preparing polyether carbonate polyols by adding alkylene oxides and carbon dioxide onto one or more H-functional starter substances in the presence of a double metal cyanide (DMC) catalyst, wherein:
    (γ) one or more H-functional starter substances and DMC catalyst are metered continuously into the reactor during the addition, and a free alkylene oxide concentration in the reaction mixture is from 1.5% to 5.0% by weight of the reaction mixture, and the resulting reaction mixture is removed continuously from the reactor.

2. The process as claimed in claim 1, wherein the free alkylene oxide concentration during the addition in step (γ) is from 1.5% to 4.5% by weight of the reaction mixture.

3. The process as claimed in claim 1, wherein the free alkylene oxide concentration during the addition in step (γ) is from 2.0% to 4.0% by weight of the reaction mixture.

4. The process as claimed in claim 1, wherein the one or more H-functional starter substances contains at least 1000 ppm of component K, wherein component K is selected from the group consisting of:
    at least one compound containing a phosphorus-oxygen bond; and
    a compound of phosphorus which can form one or more P—O bond(s) by reaction with OH-functional compounds.

5. The process as claimed in claim 4, wherein the one or more H-functional starter substances contains from 1000 ppm to 10 000 ppm of component K.

6. The process as claimed in claim 4, wherein component K is selected from the group consisting of: phosphoric acid, phosphonic acid, phosphorous acid, phosphinic acid, phosphonous acid, phosphinous acid, phosphine oxides, salts of phosphoric acid, esters of phosphoric acid, halides of phosphoric acid, amides of phosphoric acid, salts of phosphonic acid, esters of phosphonic acid, halides of phosphonic acid, amides of phosphonic acid, salts of phosphorous acid, esters of phosphorous acid, halides of phosphorous acid, amides of phosphorous acid, salts of phosphinic acid, esters of phosphinic acid, halides of phosphinic acid, amides of phosphinic acid, salts of phosphonous acid, esters of phosphonous acid, halides of phosphonous acid, amides of phosphonous acid, salts of phosphinous acid, esters of phosphinous acid, halides of phosphinous acid, amides of phosphinous acid, phosphorus(V) sulfide, phosphorus tribromide, phosphorus trichloride, phosphorus triiodide, and combinations of any thereof.

7. The process as claimed in claim 4, wherein component K is selected from the group consisting of: phosphoric acid, mono-, di- or trialkyl esters of phosphoric acid, mono-, di- or triaryl esters of phosphoric acid, mono-, di- or trialkaryl esters of phosphoric acid, $(NH_4)_2HPO_4$, phosphonic acid, mono- or dialkyl esters of phosphonic acid, mono- or diaryl esters of phosphonic acid, mono- or dialkaryl esters of phosphonic acid, phosphorous acid, mono-, di- or trialkyl esters of phosphorous acid, mono-, di- or triaryl esters of phosphorous acid, mono-, di- or trialkaryl esters of phosphorous acid, phosphinic acid, phosphonous acid, phosphinous acid, and combinations of any thereof.

8. The process as claimed in claim 4, wherein component K is phosphoric acid.

9. The process as claimed in claim 1, wherein step (γ) is preceded by an initial charging, in a step (α), of a portion of the one or more H-functional starter substances and/or a suspension medium containing no H-functional groups in a reactor.

10. The process as claimed in claim 9, wherein at least one suspension medium is used in step (α), wherein the at least one suspension medium is selected from the group consisting of: 4-methyl-2-oxo-1,3-dioxolane, 1,3-dioxolan-2-one, acetone, methyl ethyl ketone, acetonitrile, nitromethane, dimethyl sulfoxide, sulfolane, dimethylformamide, dimethylacetamide, N-methylpyrrolidone, dioxane, diethyl ether, methyl tert-butyl ether, tetrahydrofuran, ethyl acetate, butyl acetate, pentane, n-hexane, benzene, toluene, xylene, ethylbenzene, chloroform, chlorobenzene, dichlorobenzene, carbon tetrachloride, ε-caprolactone, dihydrocoumarin, trimethylene carbonate, neopentyl glycol carbonate, 3,6-dimethyl-1,4-dioxane-2,5-dione, succinic anhydride, maleic anhydride, phthalic anhydride, and combinations of any thereof.

11. The process as claimed in claim 9, wherein step (α) is followed and step (γ) is preceded by:
    (β) adding a portion of the alkylene oxide to the mixture from step (α) at temperatures of 90 to 150° C., wherein the addition of the alkylene oxide compound is interrupted.

12. The process as claimed in claim 1, wherein
    (δ) the reaction mixture continuously removed in step (γ) is transferred into a postreactor, wherein, by way of a postreaction, the content of free alkylene oxide is reduced to less than 0.05% by weight in the reaction mixture.

13. The process as claimed in claim 1, wherein the one or more H-functional starter substances is selected from the group consisting of: ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol, polyether carbonate polyols having a molecular weight Mn in the range from 150 to 8000 g/mol with a functionality of 2 to 3, polyether polyols having a molecular weight Mn in the range from 150 to 8000 g/mol with a functionality of 2 to 3, and combinations of any thereof.

14. The process as claimed in claim 1, wherein, in step (γ), the one or more H-functional starter substances is selected from the group consisting of: ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, and combinations of any thereof.

15. A process for preparing polyether carbonate polyols by adding alkylene oxides and carbon dioxide onto one or more H-functional starter substances in the presence of a metal complex catalyst, wherein the metal complex catalyst comprises zinc and/or cobalt, and wherein:
   (γ) the one or more H-functional starter substances and the metal complex catalyst comprising zinc and/or cobalt, are metered continuously into the reactor during the addition, and wherein a free alkylene oxide concentration in the reaction mixture is from 1.5% to 5.0% by weight of the reaction mixture, and wherein the resulting reaction mixture is removed continuously from the reactor.

16. The process as claimed in claim 9, wherein the step (α) further comprises an initial charging of DMC catalyst in the reactor.

17. The process as claimed in claim 9, wherein step (α) is followed and step (γ) is preceded by:
   (β) adding a portion of the alkylene oxide to the mixture from step (α) when the mixture is between a temperature of 90° C. to 150° C., wherein the addition of the alkylene oxide compound is interrupted when the mixture is not between a temperature of 90° C. to 150° C.

18. A process for preparing polyether carbonate polyols by adding alkylene oxides and carbon dioxide onto one or more H-functional starter substances in the presence of a double metal cyanide (DMC) catalyst, comprising:
   (α) charging a reactor with a portion of the H-functional starter substances and/or a suspension medium containing no H-functional groups together with the DMC catalyst;
   (β) adding a portion of alkylene oxide to the mixture from (a) at temperatures of 90 to 150° C., wherein the addition of the alkylene oxide compound is interrupted; and
   (γ) metering continuously the one or more H-functional starter substances and DMC catalyst into the reactor during the addition, wherein the free alkylene oxide concentration during the addition is from 2.0% to 4.0% by weight of the reaction mixture, and wherein the resulting reaction mixture is removed continuously from the reactor.

* * * * *